United States Patent
Block et al.

(10) Patent No.: US 8,568,233 B2
(45) Date of Patent: Oct. 29, 2013

(54) VIDEO GAME CONTROLLER ATTACHMENT APPARATUS

(75) Inventors: Gerard Lambert Block, West Hollywood, CA (US); Bradley M. Strahle, Crestline, CA (US)

(73) Assignee: Performance Designed Products LLC, Sherman Oaks, CA (US)

( * ) Notice: Subject to any disclaimer, the term of this patent is extended or adjusted under 35 U.S.C. 154(b) by 0 days.

(21) Appl. No.: 12/766,666

(22) Filed: Apr. 23, 2010

(65) Prior Publication Data

US 2010/0279771 A1     Nov. 4, 2010

Related U.S. Application Data

(60) Provisional application No. 61/172,158, filed on Apr. 23, 2009.

(51) Int. Cl.
*G06F 17/00* (2006.01)

(52) U.S. Cl.
USPC .................................. 463/37; 463/36; 463/47

(58) Field of Classification Search
USPC ................................................ 463/37, 36, 47
See application file for complete search history.

(56) References Cited

U.S. PATENT DOCUMENTS

| | | | | | |
|---|---|---|---|---|---|
| 5,851,632 | A | * | 12/1998 | Chen et al. | 428/156 |
| 6,503,153 | B2 | * | 1/2003 | Wang | 473/302 |
| 6,761,652 | B1 | * | 7/2004 | Chen et al. | 473/549 |
| 7,762,553 | B2 | * | 7/2010 | Harris | 273/148 B |
| 2004/0224765 | A1 | * | 11/2004 | Martinez et al. | 463/37 |
| 2005/0017454 | A1 | * | 1/2005 | Endo et al. | 273/317.1 |
| 2005/0075172 | A1 | * | 4/2005 | Coleman | 463/47 |
| 2006/0003840 | A1 | * | 1/2006 | Bailey | 463/36 |
| 2007/0066394 | A1 | * | 3/2007 | Ikeda et al. | 463/37 |
| 2007/0265075 | A1 | * | 11/2007 | Zalewski | 463/36 |
| 2009/0149255 | A1 | * | 6/2009 | Fu | 463/37 |
| 2009/0149256 | A1 | * | 6/2009 | Lui | 463/37 |

* cited by examiner

*Primary Examiner* — Michael Cuff
(74) *Attorney, Agent, or Firm* — Sheppard Mullin Richter & Hampton LLP

(57) ABSTRACT

According to some embodiments of the invention, a controller attachment apparatus is provided, comprising: a handle portion configured to accept and hold a controller; and an attachment portion affixed to the handle portion such that it allows a covering to be diposed over the handle portion once the controller is placed into the handle portion. For such an embodiment, the attachment portion may be in the shape of a sporting good or a weapon. For example, with respect to sporting goods, the attachment portion may take the shape of a tennis racket, paddle tennis racket, golf club, baseball bat, hockey stick, lacrosse stick, or fishing rod. Alternatively, with respect to weapons, the head portion may take the shape of a sword, dagger, blade, a light saber, a gun, or a phaser.

16 Claims, 9 Drawing Sheets

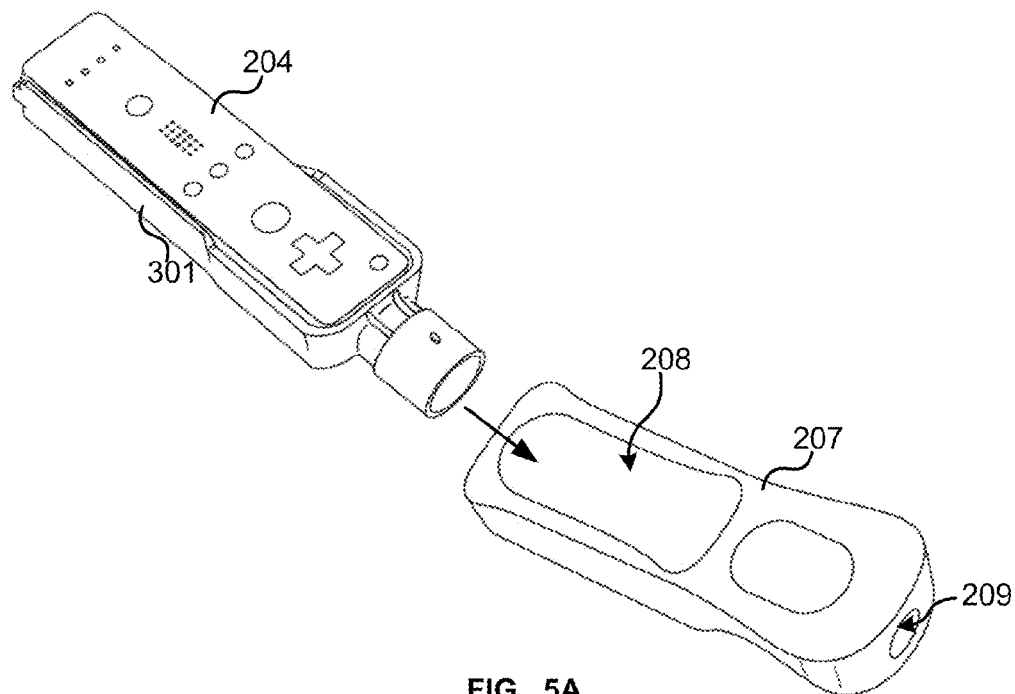
FIG. 5A
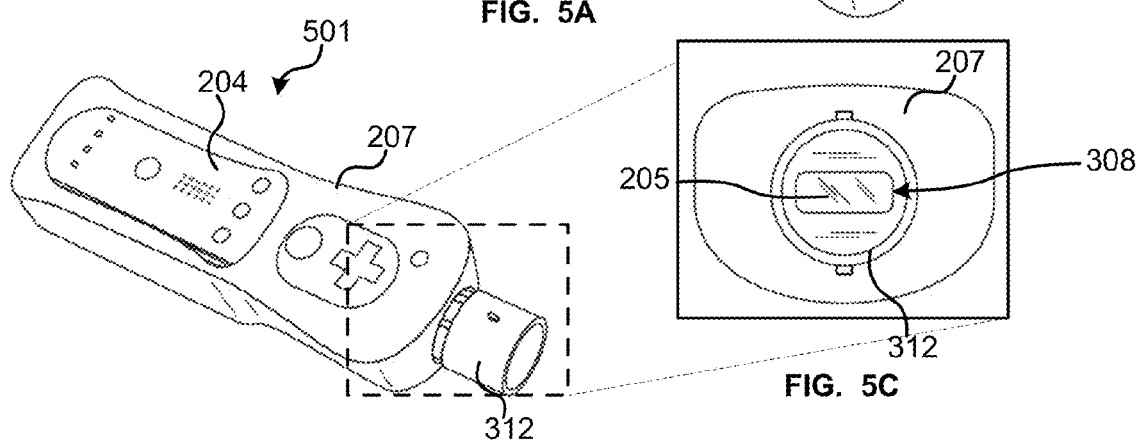
FIG. 5B
FIG. 5C
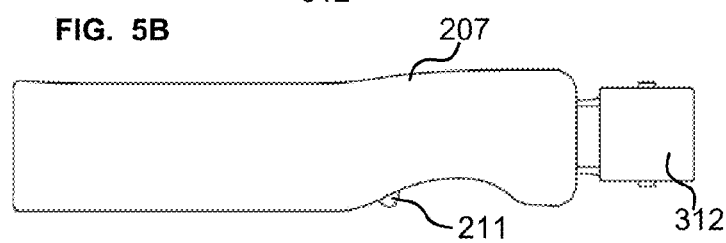
FIG. 5D
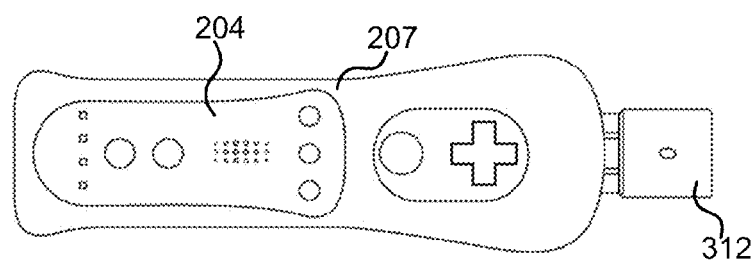
FIG. 5E

VIDEO GAME CONTROLLER ATTACHMENT APPARATUS

RELATED APPLICATION

This application claims the benefit of U.S. Provisional Application Ser. No. 61/172,158 filed Apr. 23, 2009, which is hereby incorporated herein by reference in its respective entirety.

FIELD OF INVENTION

The present invention relates to game accessories, and more particularly, some embodiments relate to an attachment apparatus for a controller, such as a computer controller or a video game controller.

DESCRIPTION OF THE RELATED ART

Modern interactive software programs, such as video games and the like, typically allow the user (e.g., a player of a video game) to provide some form of input through a device. For example, for today's typical desktop or laptop computer, the popular form of user input is through a keyboard and mouse. Within the realm of video games, the preferred form of input is through use of a game controller of one form or another. In one example, a controller might be a handheld controller that has input features such as a plurality of buttons, analog joysticks, a D-pad directional control, motion sensors (e.g., accelerometers), as well as others that provide a means for a gamer (i.e. video game player) to input desired control commands to the video game software. In turn, the inputted control commands would typically affect the game activity on the video screen.

For example, a typical controller for a Sony® PlayStation®, Microsoft® XBOX 360®, or Nintendo® Wii® gaming console is typically connected to the gaming console through a wire or wirelessly and comprises multiple buttons (for example X, O, Δ, □ or X, A, B, Y buttons, trigger buttons) and directional inputs (e.g., analog joysticks, four-way D-Pads). Other video game controllers include those built into hand-held game systems (e.g., Nintendo DS®, Sony® PSP®). For some of these controllers, such as the controllers for the Nintendo® Wii® gaming console, the controllers are also equipped with sensors that allow the gaming console to detect, among other things, when a controller is moving, in what manner a controller is moving, and the location of a controller with respect to a display output device. Such features enhance the gaming experience by increasing the level interaction between a gamer and a gaming console.

In some cases, the physical form of the controller can further enhance the gaming experience. For example, a controller might be configured as a joystick as is popular for flight simulator games, a steering wheel and pedal combination as is popular for driving games, and guitar or other musical instruments for interactive music-based games. With respect to video games based on sports, the controller may take the form of sports equipment utilized in the given sports video game. For example, for a golf video game or simulator, the controller may be shaped as a golf club to add realism to not only the appearance of the game play, but also to the feel of game play, especially with respect to controllers enabled with motion sensing. Additional examples include a bat shaped controller for a baseball game or simulator, a racket shaped controller for a tennis game or simulator, and a fishing rod shaped controller for a fishing game.

BRIEF SUMMARY OF EMBODIMENTS OF THE INVENTION

According to various embodiments of the invention a controller apparatus is provided and, more specifically, for some embodiments an attachment apparatus is provided that is combinable with a computer or video game controller.

According to some embodiments of the invention, a controller attachment apparatus is provided, comprising: a handle portion configured to accept and hold a controller; and an attachment portion affixed to the handle portion such that it allows a covering to be diposed (e.g., attached or slipped) over the handle portion once the controller is placed into the handle portion. For such an embodiment, the attachment portion may be in the shape of a sporting good or a weapon. For example, with respect to sporting goods, the attachment portion may take the shape of a tennis racket, paddle tennis racket, golf club, baseball bat, hockey stick, lacrosse stick, or fishing rod. Alternatively, with respect to weapons, the attachment portion may take the shape of a sword, dagger, a light saber, a gun, or a phaser.

In some embodiments, the handle portion comprises a holding mechanism to hold the controller in place once the controller is placed into the handle portion. Further, in some such embodiments, the holding mechanism is of sufficient flexibility as to allow the controller to be clipped into and removed from the handle portion. For example, the holding mechanism may be a tab or clip.

In addition, to allow for compatibility with a controller, in some embodiments, the handle portion comprises a cut-away portion that allows access to a controller input or port once a controller is placed into the handle portion. For example, the handle portion may comprise cut-away portions that allow access to controller inputs such as buttons, directional pads, joysticks, switches, and triggers.

In additional embodiments, the handle portion and the attachment portion are a unitary piece. In other embodiments, the attachment portion is removably affixed to the handle portion through a coupling mechanism that allows the attachment portion to detach from the handle portion. In either case, the attachment portion may be affixed to the handle portion such that a covering may be placed over the handle after the controller is inserted. If the attachment portion is affixed with the handle portion through the unitary consturction, then the attachment portion may be shaped to allow the use of the cover. If the attachment portion is affixed with the handle portion through a coupling mechanism, then in some embodiments, the attachment portion may be removed to allow the covering. For example, the coupling mechanism may be a twist mechanism, sliding mechanism or a snap-on mechanism that allows the attachment portion to attach and detach from the handle portion.

In another example, the couple mechanism may comprise: an attachment mechanism disposed on the handle portion, a sleeve disposed on the attachment portion, a protrusion disposed on the sleeve or the attachment mechanism, a track configured to accept the protrusion when the attachment mechanism is inserted into the sleeve, and a locking mechanism positioned at the end of the track configured to engage the protrusion once the attachment mechanism is inserted into the sleeve and the protrusion reaches the locking mechanism. The length of the track and the position of the locking mechanism may be such that compression from an elastic covering assists the locking mechanism in engaging the protrusion. In addition, when the protrusion is disposed on the sleeve, the track is disposed on the attachment mechanism, and when the protrusion is disposed on the attachment mechanism, the track is disposed on the sleeve. Further, the coupling mechanism may be configured such that compression from an elastic covering that is diposed over the handle portion assists the coupling mechanism in securing the attachment portion to the handle portion.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIGS. 5A-5E are diagrams illustrating the use of the example handle portion of FIGS. 3A-3D with the example game controller and example controller cover/sheath of FIGS. 2A-2B in accordance with one embodiment of the present invention.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

DETAILED DESCRIPTION OF THE EMBODIMENTS OF THE INVENTION

The present invention is directed toward accessories and attachments for handheld electronic devices such as, for example, computer or video game controllers. For example, in a video game environment, in one embodiment an attachment accessory includes a handle portion to contain a remote control apparatus for the video game, and an attachment portion to provide a desired appearance for the control apparatus. For example, the add-on accessory can include a recess or cut-away portion to hold a game controller (such as a Wii® motion controller). In additional examples, the attachment portion can be fashioned in the shape or appearance of sporting goods, weapons, or other shapes as may be appropriate for the gaming experience. The accessory can be configured in a number of different shapes and forms to mimic (closely, loosely, or fancifully) implements used by characters in a game.

Before describing the invention in detail it is useful to describe a few example environments with which the invention can be implemented. One such example is that of a computing system, such as a gaming system, used by one or more participants, such as video game players (garners), to participate in a group activity, such as playing a computer game or video game.

Figure 1:
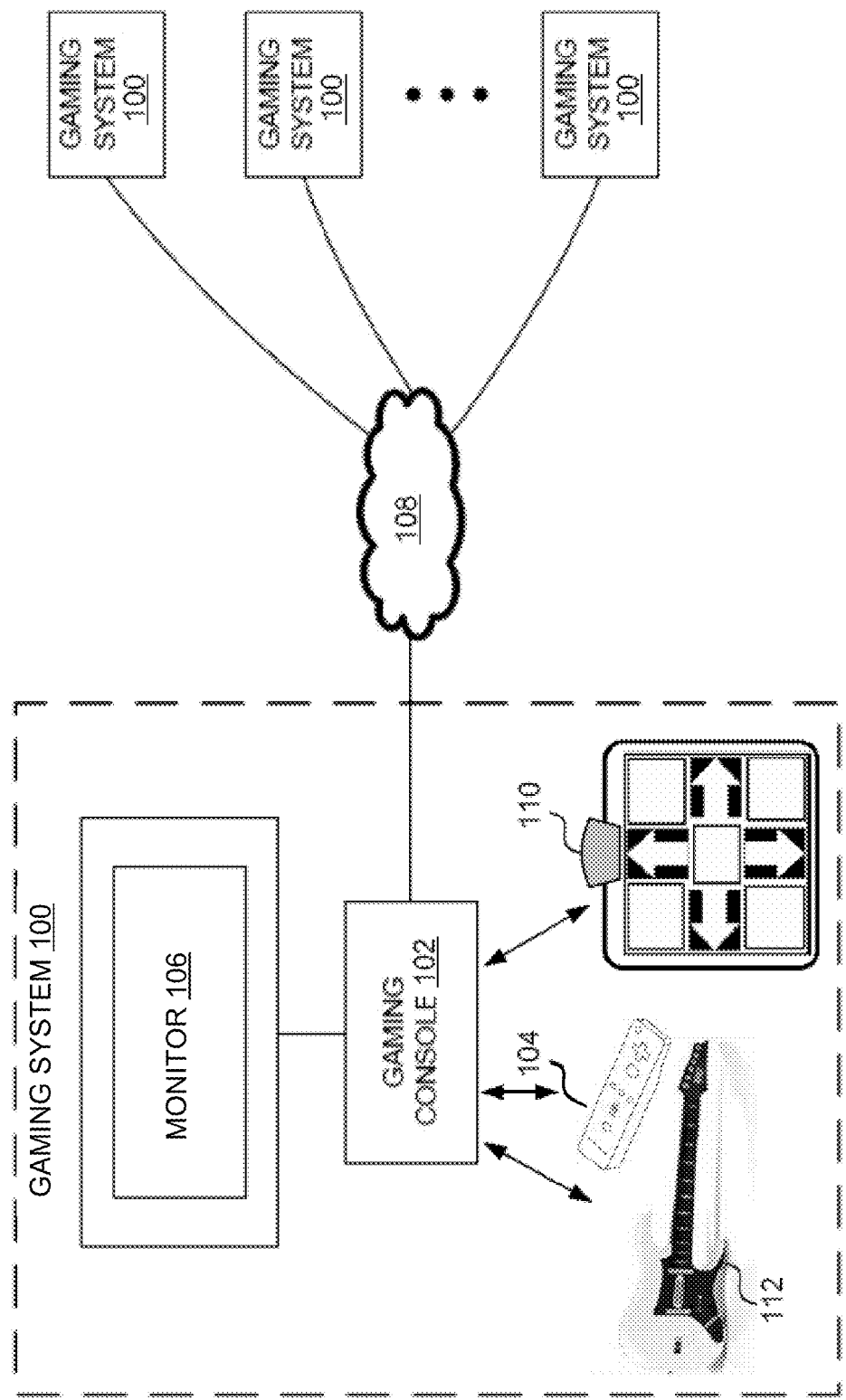
FIG. 1 is a block diagram illustrating an example gaming environment with which at least one embodiment of the present invention can be used.

FIG. 1 is a block diagram illustrating a generalized version of a gaming system 100 as one example of an environment with which the invention can be implemented. Referring now to FIG. 1, the example gaming system includes a gaming console 102, a monitor 106, and a variety of controllers such as a dance pad game controller 110, and a musical-instrument game controller 112, and a traditional game controller 104. The illustrated example also includes an interface to a communication medium or communication network 108 such as, for example, the Internet or other communication channel.

In one environment, gaming console 102 might be implemented as a PlayStation®, XBOX 360®, Wii® or other like gaming console. In another implementation, gaming console 102 might be implemented as a personal computer or other like computing device. A gaming console 102 would typically include a processor or other computing device providing the ability to allow gaming applications, which are typically software applications, to be run thereon. A gaming application might be installed, for example, through the use of CD ROM drives, DVD drives, or other storage medium or communications interfaces. Typically, a gaming console 102 can be analogized to a computer or computing system to run the gaming software. In another environment, the gaming console 102 might be implemented as a personal computer.

A monitor 106 is typically provided to allow the gaming environment to be displayed to the gamer during game play. Monitor 106 can also be used to display menus and other features to the gamer to enhance the game play environment. Various interfaces might be provided between gaming console 102 and monitor 106 to provide the proper video signal to drive monitor 106. For example, RGB, NTSC, VGA, and other signal types or specifications can be used to provide communications between gaming console 102 and monitor 106. Alternatively, a video projector or other viewing mechanism (not shown) can be utilized in place of the monitor 106 to provide similar display functionality.

As illustrated, speakers can also be provided, separately or with monitor 106, to provide audible information to the gamer during game play and setup. For example, in one embodiment, monitor 106 might be implemented as a television with built in speakers that is connected to the gaming console via a coaxial or other audio and video input.

Gaming controller 104 can be used to allow gamers to provide input to the game software as well as to receive feedback from the game software during setup and game play. As described above, controller 104 can include, for example, X, Y, A, B buttons, trigger buttons, analog joysticks, key pads, and other devices to allow the user to provide input to the game. By actuating these various buttons, switches or joysticks, the gamer can control the operation of the game, such as controlling characters or vehicles in the game. The interface between gaming console 102 and controller 104, dance pad game controller 110, and musical-instrument game controller 112 might be either wired or wireless interfaces as may be desired. Likewise, throughout this document, references to communication or signal interfaces can be implemented using wired or wireless interfaces, unless otherwise specified.

Also illustrated in the example of FIG. 1 is a communications connection to a network 108. For example, a user may wish to connect the gaming console 102 to the interne or other communication medium whereby game information can be downloaded or uploaded to various websites, online services such as XBOX Live™, or other entities or services. Also, through a communication medium 108, gamers might compete amongst other gamers at their gaming systems 100, even if such other gamers at remote or distant locations. Note that depending on the gaming environment, remote gaming systems 100 might or might not have similar configurations to one another.

Although not depicted, game system 100 can have feedback devices, or stimulus, that can be used to provide sensory feedback from the gaming console to the user. The game system 100 can also have biosensors allowing for bioinformation (e.g., biometrics) regarding the user to provided to the console. Both the biosensors and feedback devices can communicate to the gaming console 102 via a separate communication path from the controllers 104, 110, and 112. For example, feedback devices can communicate through the USB ports or like communication ports as those found on gaming consoles such as the XBOX 360®, PlayStation® and personal computing system. Biosensors and feedback devices can also be configured to connect through ports of handheld gaming consoles 102, often referred to as expansion ports. As a further example, biosensors and feedback devices can communicate with gaming consoles 102 via wireless communication interfaces.

In yet another embodiment, feedback devices and biosensors can communicate with the gaming console via a communication path through the gaming controller 104. For example, the communication controller can be equipped with another communication interface and the biosensors, feedback devices, or both are communicatively coupled (whether hard wired or wirelessly) to the gaming controller 104. As one specific example of this case, a biosensor and feedback device can be configured for communicative coupling to a Wii® controller via the Wii® controller's Wii Nunchuck® pass-through port. As these examples serve to illustrate, there are a number of mechanisms by which a biosensor or feedback device can be interfaced to a controller or to the gaming console.

Figure 2A:
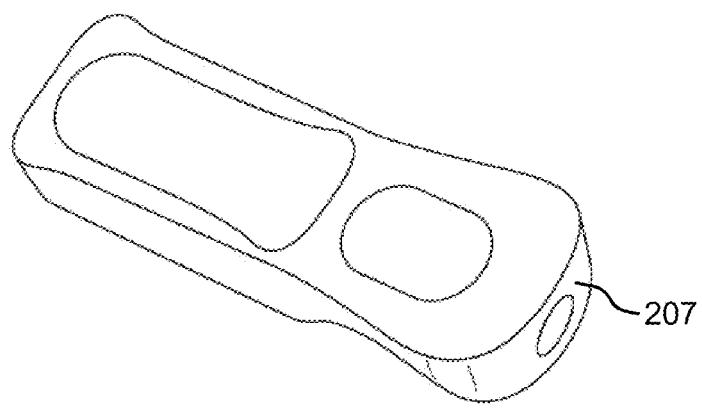
FIGS. 2A-2B are diagrams illustrating an example game controller and example controller cover/sheath that can be used with at least one embodiment of the present invention.
Figure 2A:
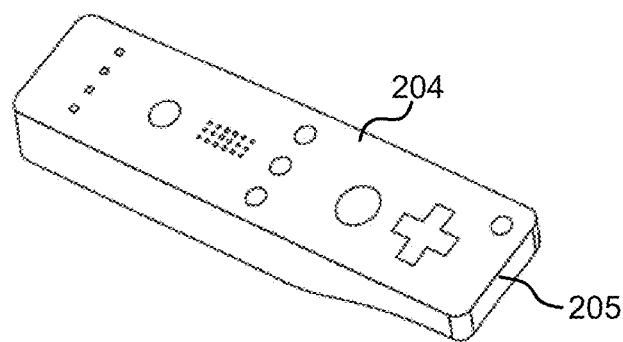

FIG. 2A is a an embodiment of the invention implemented with a motion controller used with the Wii® gaming system. As known in the art, the Wii® motion controller allows a range of gamer body motions such as hand or arm motions to be translated into electronic signals to control the video game character. In addition, Wii® motion controller has an infrared window 205 located at the proximal end of the controller. Using the controller, the gamer can simulate swinging a bat, tennis racket, golf club, sword, or other gaming implement in the gaming environment.

Figure 2B:
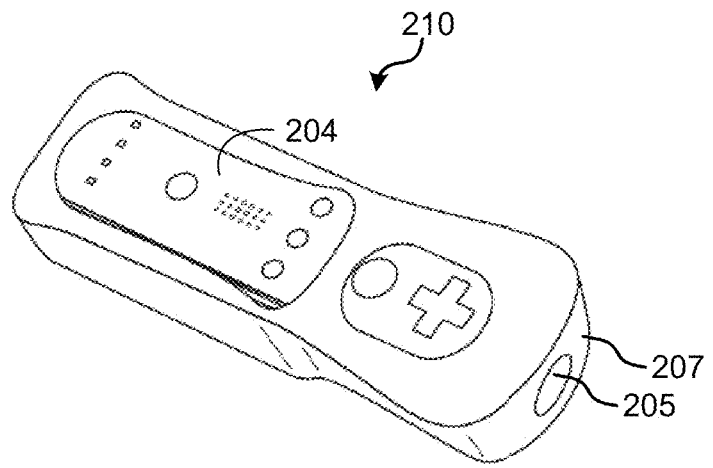

FIG. 2b illustrates an elastomeric sheath or skin 207 for the controller. The sheath may be optionally placed over controller 204 to improve its grip and provide a soft feel for the controller 204. In addition, this skin 207 provides a cushioning effect in the event the controller strikes an object or for drop resistance if it is inadvertently released from a gamers hand. This skin 207 can be made of an elastomeric or other resilient material that allows the skin can be stretched to fit over the controller and also provides a cushioning effect in the event the controller strikes an object or is inadvertently released from a gamers hand. Often times, such skins are sold as separate add-on accessories to the gaming controller. However, for some game systems, some skin are standard equipment on the controller and, possibly, are required for the controller to be compatible with other controller accessories.

FIG. 2B illustrates a configuration 210 where controller 204 is covered by the skin 207. As illustrated, the skin 207 almost completely surrounds the corners and sides of the controller to afford the desired cushioning effect. As illustrated in FIGS. 11, 15, and 16, which are described later in greater detail, the skin 207 may also skin include a cutout on the bottom to provide access to the Wii® remote trigger of controller 204.

From time-to-time, the present invention is described herein in terms of these example environments of a gaming system and a Wii® controller. Description in terms of these environments is provided to allow the various features and embodiments of the invention to be portrayed in the context of an exemplary application. After reading this description, it will become apparent to one of ordinary skill in the art how the invention can be implemented in different and alternative environments and applications, including different gaming systems or other computing systems, as well as with different controller devices.

As briefly described above, the present invention is directed toward accessories for hand held devices or controllers, such as video game controllers, that can be coupled with the controller to provide a desired appearance. For example, an add-on accessory can allow a gaming controller to assume the form of a gaming implement such as a sporting item (e.g., a tennis racket, table tennis racket, golf club, baseball bat, hockey stick, lacrosse stick, or other sporting implement), a weapon (e.g., a sword, dagger, light saber, gun, phaser, or other weapon), a vehicular control mechanism (e.g., a joy stick, steering wheel, etc.) or other game play implement.

In one embodiment, the controller accessory can be a single-piece accessory or it can be provided as a two-piece (or multiple-piece) accessory. For example, in one embodiment, a two-piece accessory can be provided having a handle portion and an attachment portion. In such an embodiment, the accessory can be configured to house the remote control, and multiple attachment portions can be provided to allow interchangeability of multiple implements with a given remote portion. Accordingly, the user can be provided with the flexibility to swap out different heads or implements such as a sports head, weapon head, vehicular head, and so on.

Figures 3A, 3B:
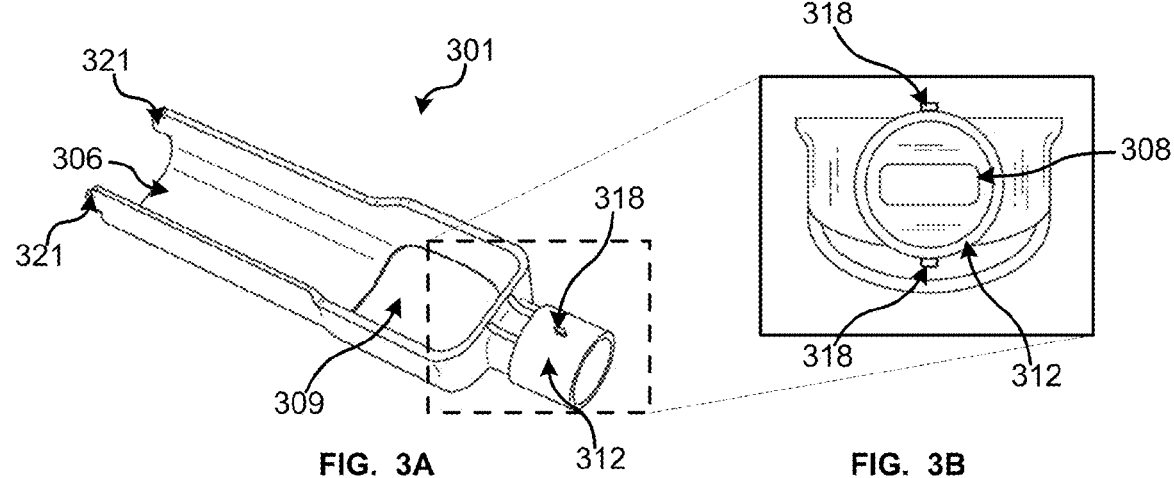
FIGS. 3A-3D are diagrams illustrating an example handle portion of an attachment apparatus in accordance with one embodiment of the present invention.

FIGS. 3A-3D illustrate a handle portion 301 of a multi-piece attachment apparatus in accordance with one embodiment of the present invention. Referring now to FIG. 3A, as shown in the embodiment, handle portion 301 is shaped with a recess or a trough-like structure 306 designed to accept and house a game controller. In this particular embodiment, handle portion 301 is designed for a Wii® remote controller such as controller 204. Also illustrated is a cut out 309 configured to accommodate a Wii® remote trigger once such a controller is placed into the recess structure 306, and a cut out 308 for the infrared window of a Wii® remote (i.e., opening 204). As would be apparent to one of ordinary skill in the art after reading this description, cut outs be provided in various shapes and configurations to allow access to buttons, switches, triggers, or other control mechanisms were feedback mechanisms for a given controller. Accordingly, the accessory can be configured in such a way as to be compatible with any of a variety of control apparatus.

Continue with reference to FIG. 3A, the illustrated embodiment also includes tabs 321 at the distal end of the handle portion 301 to hold the remote control in place once it is placed into structure 306. Alternative embodiments may use other catch mechanisms in place of tabs 321. The illustrated tabs 321 are also configured to allow removal of the Wii® controller after it has been placed in structure 306 and locked in place by the tabs 321. As such, the tabs or other mechanism can be made of a polycarbonate or other like material that is relatively inexpensive to produce, yet provides sufficient stiffness and resiliency so as to allow the controller to be easily clipped into and removed from the handle portion. In some embodiments, the tabs or other locking mechanism can be made from the same material as a handle portion and can also be constructed as an integral piece thereof as a unitary article of construction. As this example illustrates, other locking or clipping mechanisms can be used to hold the controller in place in handle portion during game play.

With further regard to structure 306, as illustrated, the top of the handle portion in this embodiment is open, which allows the remote to be placed directly into the accessory handle. A soft skin, such as skin 207 illustrated in FIG. 2A, can be placed around the outside of the handle portion to encase the handle portion and the controller. This can also serve to retain the controller in the handle portion.

FIG. 3A also illustrates a coupling mechanism 312 used to attach the handle portion to a head portion (not shown). In the illustrated embodiment, the coupling mechanism 312 is configured to allow one or more head portions to be removably affixed to the handle portion. It is positioned at the proximal end of handle portion 301, and is a cylindrical in shape. A locking mechanism can also be included to provide a secure attachment to the handle portion to ensure that the head portion does not become separated from the handle portion during normal game play.

FIG. 3B provides another view angle of coupling mechanism 312. As illustrated, the couple mechanism is configured with cylindrical protrusions 318, designed to fit into tracks or threads of an attachment portion (not shown) when the attachment portion is coupled with handle portion 301. With these protrusions 318, an attachment portion (not shown) can be attached to the handle portion in a removable fashion. As described below, these cylindrical protrusions are configured to engage thread-like grooves in a sleeve of an attachment portion such that the attachment portion can be screwed or twisted onto the handle portion. In some embodiments, each protrusion 318 is specifically is also designed to engage a lock mechanism that is provided at the end of a track or thread of the attachment portion. These protrusions may be configured to different other designs in such a way as to be compatible with other different attachment portions or, alternatively, compatible with several attachment portions at once. The protrusions may also be configured such that the attachment portion attaches to a handle portion in predetermined manner or orientation.

Figure 3C:
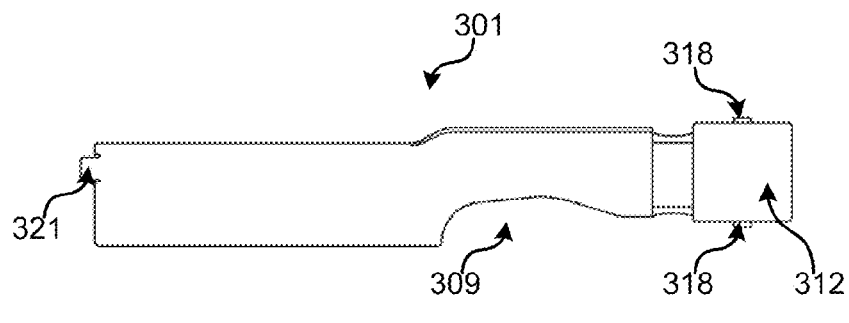
Figure 3D:
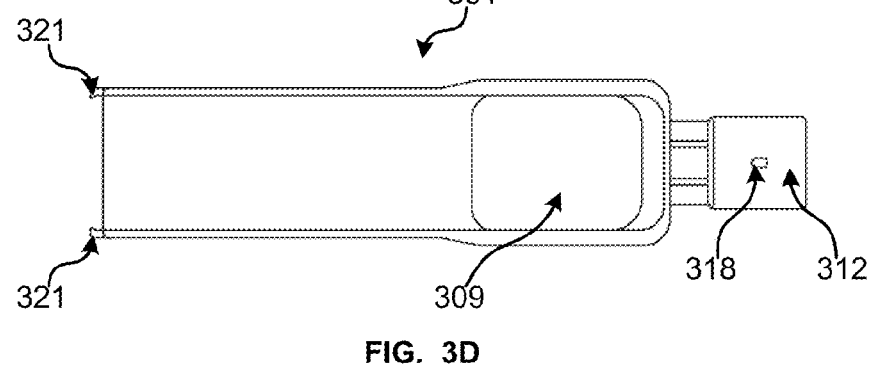

FIG. 3C is a side view of handle portion 301, and FIG. 3D is a top view of the same. As can be seen in FIGS. 3C and 3D, the cutaway portion 309 at the bottom of the handle portion is shaped so as to conform to the trigger recess of a Wii® controller, such as controller 204. As previously stated above, the cutaway portion 309 can take on different shapes or dimensions depending on the controller with which the accessory is implemented. These views also illustrate the example spring tabs 321 at the distal end of handle portion 301, used to hold the controller in place once placed into handle portion 301.

In some emboidments, a multiple piece accessory having the handle portion separate from the head portion facilitates attachment of the soft skin to the outside of a handle portion. In one embodiment the handle portion is configured such that a soft skin that would normally be used with a Wii® remote (e.g., the example controller illustrated in FIGS. 2A and 2B). For example, because the skin included with the Wii® remote has an opening so as to not obscure the infrared window on the proximal end of the controller, the coupling mechanism in the illustrated example is sized so as to allow the handle portion to be inserted through this opening in the skin, allowing the skin to be diposed over (e.g., attached or slipped around) the gripping area of the handle portion. As such, in operation, the remote can be placed in the handle portion, snapped into place, and then the soft skin can be disposed over the handle portion and the Wii® remote control contained therein. With the soft skin in place, various implements with mating heads can be subsequently attached to the handle portion using a coupling mechanism in accordance with an embodiment.

Figure 4A:
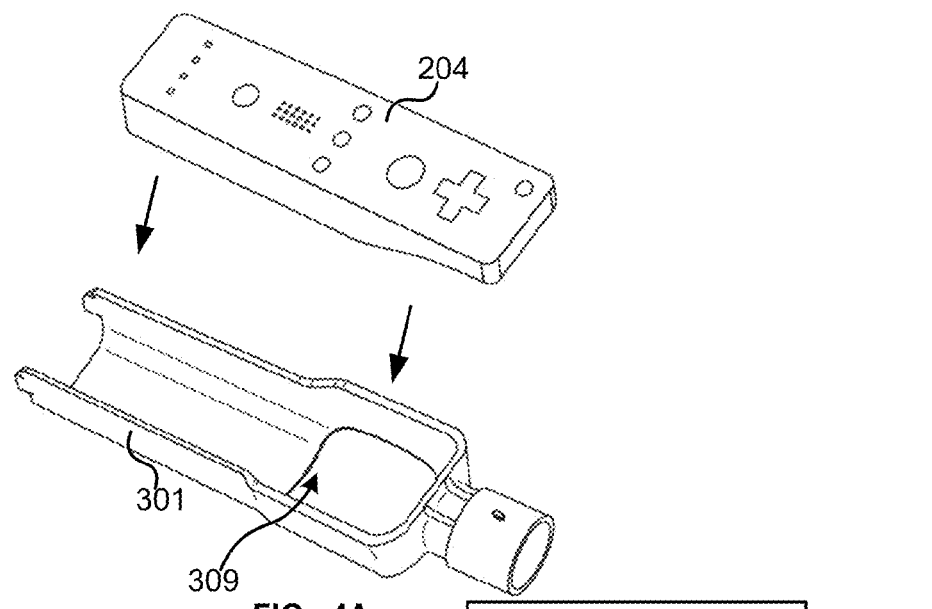
FIGS. 4A-4E are diagrams illustrating the use of the example handle portion of FIGS. 3A-3D with the example game controller of FIG. 2A-2B in accordance with one embodiment of the present invention.
Figures 4B, 4C:
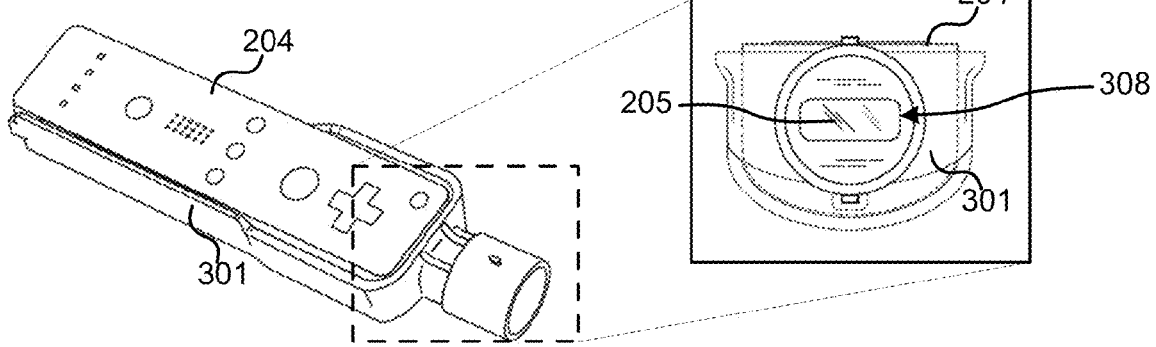
Figure 4D:
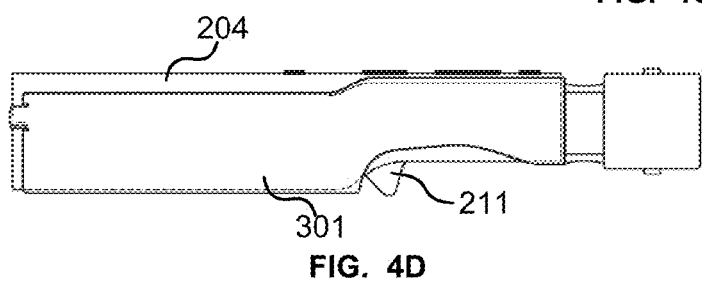
Figure 4E:
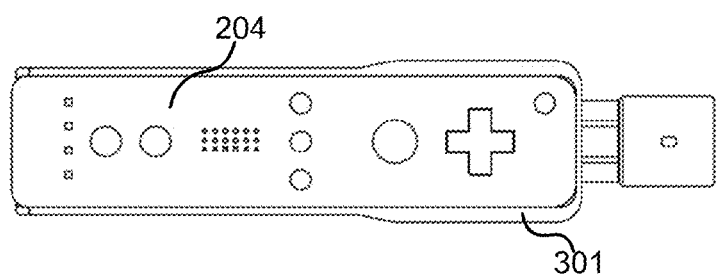

FIGS. 4A-4E illustrate the use of the example handle portion 301 of FIGS. 3A-3D with example game controller 204 of FIGS. 2A-2B, in accordance with one embodiment of the present invention. As illustrated by FIGS. 4A-4E, and previously stated above, handle portion 301 is configured to conform to the form factor of a Wii® remote control (i.e., controller 204). FIG. 4D additionally illustrates how the cut out 309 of handle portion 301 provides access to the Wii® remote trigger 211 of controller 204, and opening 308 of handle portion 301 provides an aperture for the infrared window of controller 301.

FIGS. 5A-5E illustrate configuration 501 where example handle portion 301 of FIGS. 3A-3D is used with example game controller 204 and example controller cover/sheath 207 of FIGS. 2A-2B, in accordance with one embodiment of the present invention. As illustrated in FIGS. 5A-5E and described above, handle portion 301 is sized sufficiently to allow the handle portion to be inserted through an opening 208 in the skin 207, allowing the skin to be disposed over the gripping area of handle portion 301. Also illustrated in FIGS. 5A-5E, is the opening 209 in the skin 207 configured into the skin as to not obscure the infrared window on the proximal end of controller 301. As illustrated, coupling mechanism 312 is sized to be inserted through opening 209 and protrude outside skin 207 to be ready for attachment with a head portion (not shown). Further illustrated in FIG. 5C, a top-down view of the couple mechanism, is opening 308, which like the opening of 209 of skin 207 also prevents handle portion 301 from obscuring the infrared window 205 on the proximal end of controller 204 when a head portion is not attached to handle 301. Additionally, FIG. 5D illustrates how both the handle portion 301 and skin 207 have a cut out to allow access to the Wii® remote trigger 211 of controller 204.

Although a number of configurations can be used to attach the attachment portion to the handle portion, the examples described herein show an attachment portion having a sleeve that is molded in multiple pieces for assembly and manufacturing purposes. Other processes and techniques can be used to create the sleeve for attachment to the coupling mechanism of the handle portion.

Figure 6A:
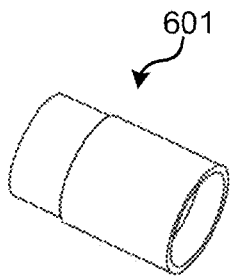
FIGS. 6A-6G are diagrams illustrating an example sleeve of an attachment portion for an attachment apparatus in accordance with one embodiment of the present invention.
Figure 6B:
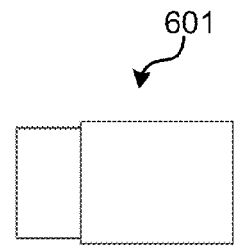
Figure 6C:
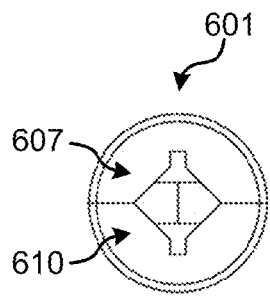

FIGS. 6A-6G are diagrams illustrating an example attachment portion of an attachment apparatus in accordance with one embodiment of the present invention. Specifically, FIGS. 6A-6C illustrate a sleeve 601 of an attachment portion once it is assembled. The sleeve 601 is configured to accept and attach to a coupling mechanism, identical or similar to couple mechanism 312. The illustrated sleeve 601 is assembled from two pieces, piece 607 and piece 610. It would be appreciated by one of ordinary skill in the art that other embodiments of the present invention may be suitable created of more than two pieces or, alternatively, be constructed as one unitary piece. The example sleeve of the attachment portion illustrated in FIGS. 6A-6G includes tabs and other attachment mechanisms that allow the multiple pieces (607, 610) of sleeve 601 to be assembled into a single piece. Glues or plastic welds may be used to affix the attachment portion halves together to form the sleeve.

Figure 6D:
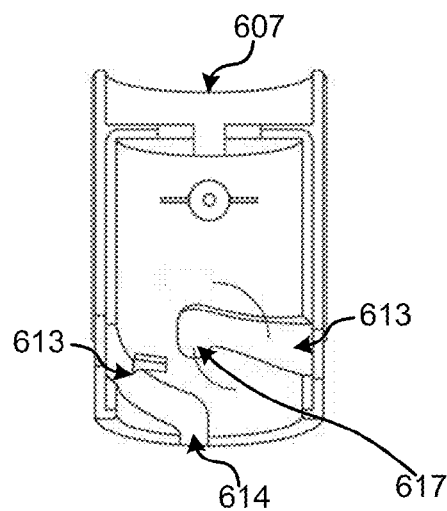
Figure 6F:
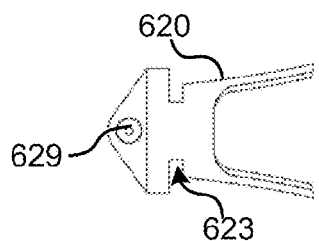
Figure 6G:
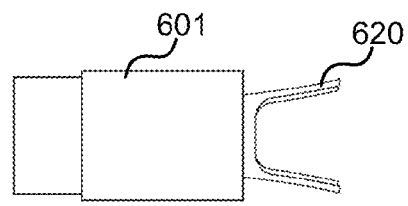
Figure 6E:
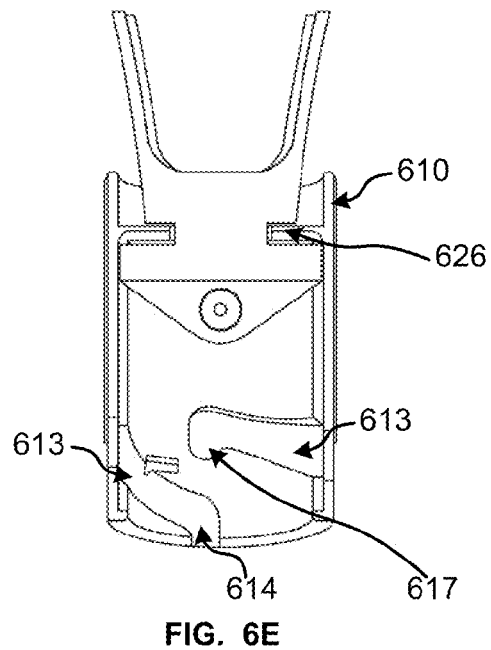
Figure 7:
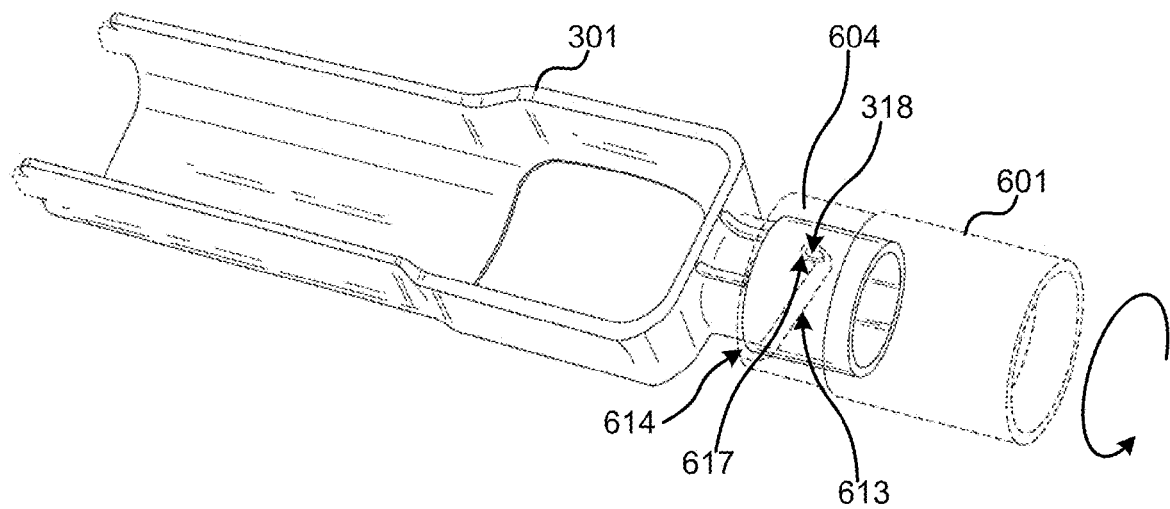
FIG. 7 is a diagram illustrating the use of the example handle portion of FIGS. 3A-3D with the example sleeve of FIGS. 6A-6C in accordance with one embodiment of the present invention.
Figure 8A:
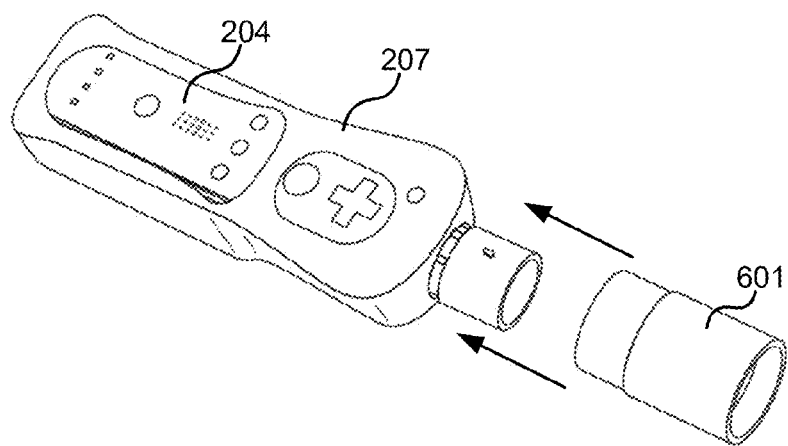
FIGS. 8A-8E are diagrams illustrating the use of the example handle portion of FIGS. 3A-3D and the example sleeve of FIGS. 6A-6C with the example game controller and example controller cover/sheath of FIGS. 2A-2B in accordance with one embodiment of the present invention.
Figures 8B, 8C:
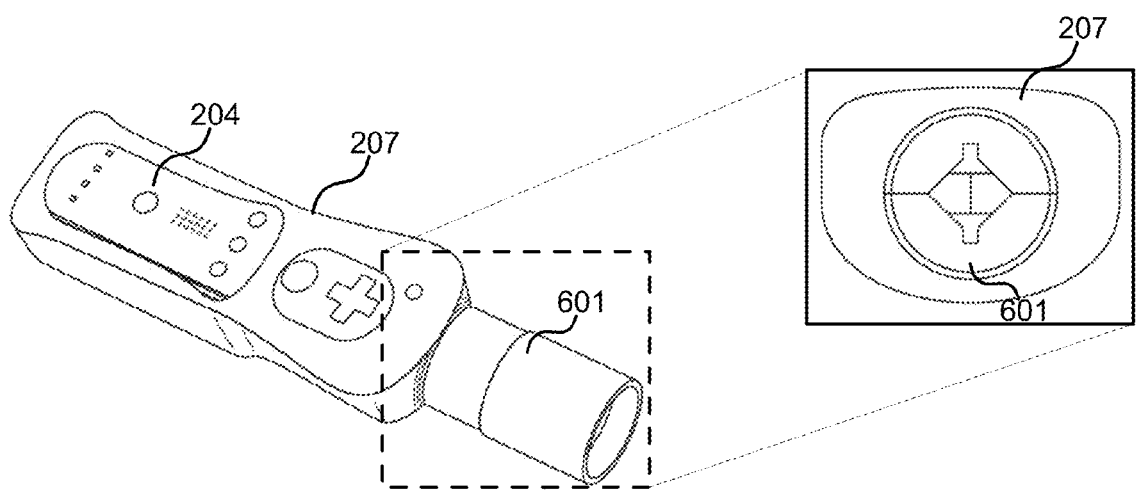
Figure 8D:
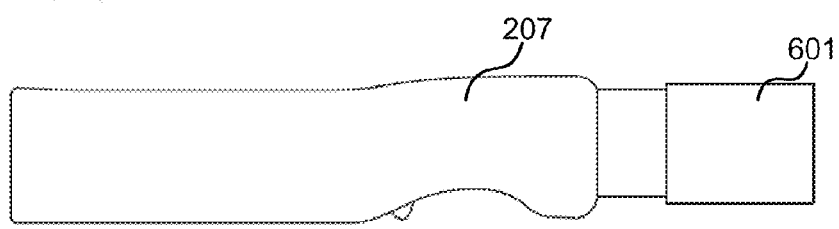
Figure 8E:
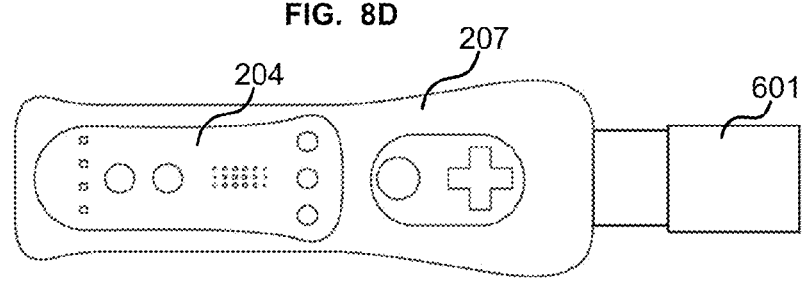

Turning now to FIG. 6D, which illustrates piece 607 in further detail, and FIG. 6E, which illustrates piece 610 in further detail, both pieces 607 and 610 are configured with interior surfaces having tracks, grooves or threads 613, in the sleeve 601 of the attachment portion. As such, the internal circumference of sleeve 601 is configured to allow protrusions of a handle portion's coupling mechanism to engage the threads, thereby allowing a handle portion to be threaded into place with the attachment portion. In the illustrated embodiment, each of these threads 613 is configured to accept a protrusion configured on a couple mechanism, such as protrusion 318 on couple mechanism 312. When an attachment portion is attaching itself to a couple mechanism, a protrusion of the couple mechanism would begin at the start 614 of the thread 613, where the protrusion is accepted by the attachment portion, and then guided into place at the end 617 of the thread 613. In the present embodiment, thread 613 ends with a locking mechanism 617, which engages the protrusion once it reaches the end of the thread, thereby locking the attachment portion to the handle portion. Such is shown in FIG. 7, where the use of the example handle portion 301 of FIGS. 3A-3D is used with the example sleeve 601 of FIGS. 6A-6C is illustrated.

In one embodiment, the threads are configured such that the sleeve is required to compress the soft skin, allowing the soft skin to act as a spring lock for the sleeve. For example, continuing with reference to FIGS. 6D and 6E, locking mechanism 617 may be positioned such that in order for sleeve 601 to attach to handle portion 301 and lock into place (via couple mechanism 312), skin 207, which is surrounding handle portion 301, would need to be compressed. In one example, this may be achieve by configuring threads 613 to extend to a depth into sleeve 601 such that sleeve 601 is in contact with the soft skin on the handle portion when the handle portion is attached to the coupling mechanism of the handle portion. By doing so, skin 207 due to its elastomeric properties would act as a spring, applying pressure on sleeve 601 such sleeve 601 is pushes outward. This would result in the protrusions, such as protrusions 318 of couple mechanism 312, to engage with their respective locking mechanisms 317. Other forms of couple and locking mechanisms may be used in order to lock an attachment portion to a handle portion in accordance with the present invention.

Accordingly, some pressure is required in such embodiments to compress the soft skin to allow the attachment portion to be threaded onto the handle and locked into place. Likewise, pressure is required to compress the elastomeric skin to disengage the attachment portion from the handle portion. The threads and locking mechanism may be configured in such a way that sufficient pressure is required to compress the elastomeric skin such that a snug fit provided.

Once assembled, the pieces 607 and 610 form a sleeve 601 configured with an interior surface having 2 thread-length tracks inside sleeve 601. As described above, the slots or tracks on the inside of the cylinder are sized to accept the protrusions 318 on coupling mechanism 312, such that the coupling mechanism can be threaded into the sleeve. In some embodiments, the 2 threads illustrated may extend approximately 180° around the inner circumference of the sleeve. By doing so, the attachment portion to be attached to the handle portion with approximately a one half turn.

Figure 9A:
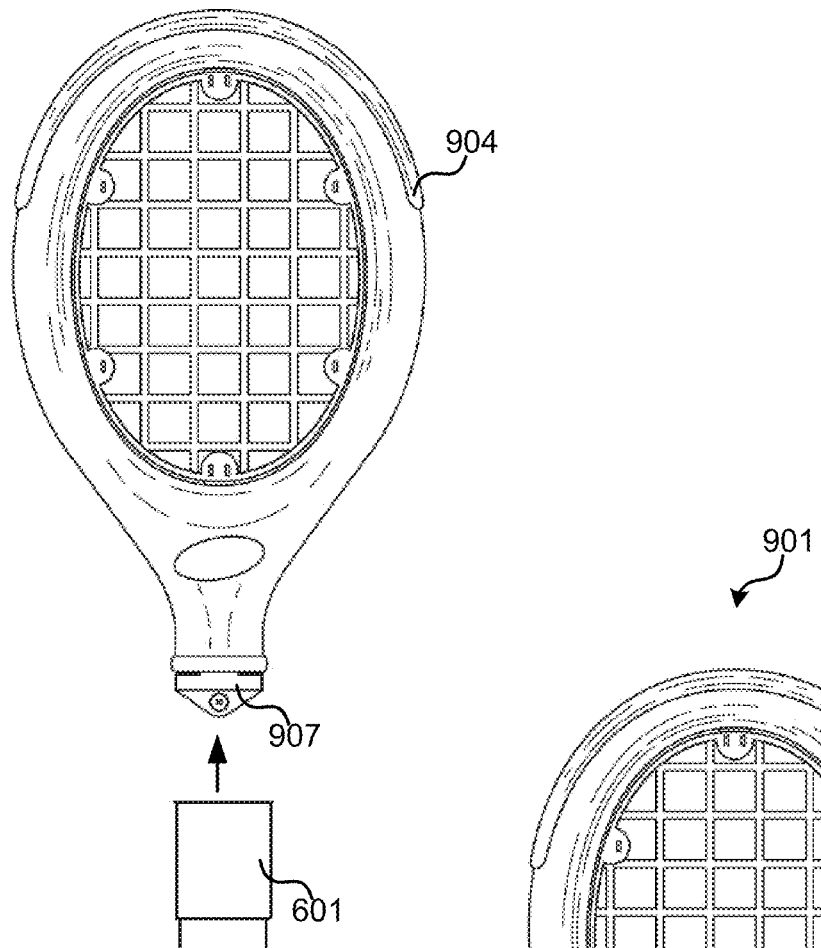
FIGS. 9A-9B are diagrams illustrating an example tennis sports attachment portion in accordance with one embodiment of the invention.
Figure 9B:
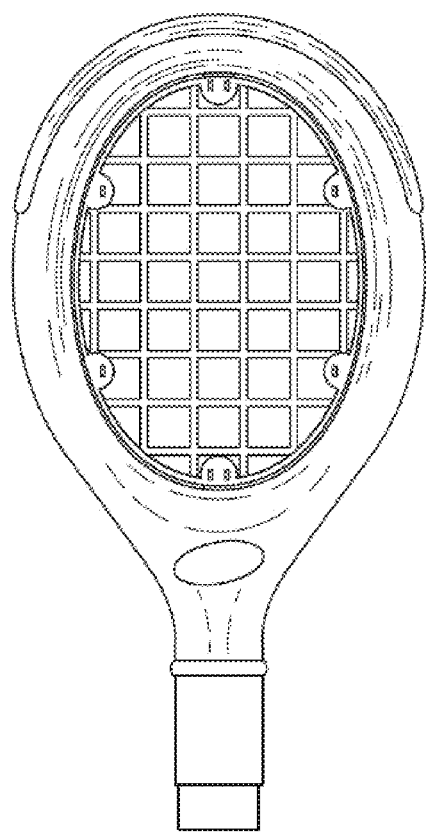

FIGS. 6F and 6G illustrate a bayonet attachment mechanism 620 used in conjunction with sleeve 601 in order to complete the remainder of the attachment portion in accordance with some embodiments of the invention. In particular, with use of the bayonet attachment mechanism, additional components may be attached to attachment portion in order to complete the final, desired shape of the attachment portion. For example, bayonet mechanism 620 would allow a component shaped as a tennis racket, golf club, baseball bat, hockey stick, lacrosse stick, or fishing rod to be attached to the sleeve 601, thereby completing the construction of the attachment portion. FIGS. 9A and 9B illustrate such a completed attachment portion, and how assembly of the final attachment portion is facilitated using a bayonet mechanism. As illustrated in FIGS. 9A and 9B, an example tennis sports attachment portion 901 combining a sleeve 601 with a tennis racket shaped component 904 having a bayonet mechanism 907. It should be noted that although a bayonet mechanism is illustrated in this embodiment, any of a number of mechanisms can be used to attach the sleeve assembly to the remainder of the attachment portion.

Continuing with reference to FIGS. 6E and 6F, a hole 629 in the bayonet mechanism 620 is provided to allow separate pieces of the sleeve of the attachment portion (e.g., 607 and 610) to be joined together using a screw or like mechanism, while concurrently securing the bayonet mechanism 620 to the sleeve. Also illustrated are cutouts 623 of bayonet mechanism 620, which correspond to complementary protrusions 626 in the sleeve and facilitate alignment of the bayonet for assembly. Other mechanisms including glues, welds and other attachment means can be used to assemble the sleeve.

Referring now to FIGS. 8A-8E, the diagrams illustrate the use of example handle portion 301 of FIGS. 3A-3D in conjunction with example sleeve 601 of FIGS. 6A-6C, and example game controller 204 and example controller cover/sheath 207 of FIGS. 2A-2B, in accordance with one embodiment of the present invention.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

What is claimed is:

1. A controller attachment apparatus, comprising:
   a handle portion comprising a recess configured to accept and retain a controller and further comprising a first coupler disposed on an end of the handle portion;
   an attachment portion comprising a second coupler disposed thereon and configured to mate with the first coupler, the attachment portion configured to be releasably affixed to the handle portion by the first and second couplers; and
   a flexible covering configured to be removably disposed on and covering at least a part of the handle portion and comprising a first opening conforming to the first coupler, and configured to apply pressure to the first or second coupler to thereby facilitate locking the first and second couplers in a coupled configuration, wherein the flexible cover comprises a second opening to provide access to the controller.

2. A controller attachment apparatus of claim 1, wherein the attachment portion is shaped like a spotting good or a weapon.

3. The controller attachment apparatus of claim 2, wherein the sporting good is a tennis racket, paddle tennis racket, golf club, baseball bat, hockey stick, lacrosse stick, or fishing rod.

4. The controller attachment apparatus of claim 2, wherein the weapon is a sword, dagger, blade, a light saber, a gun, or a phaser.

5. The controller attachment apparatus of claim 1, wherein the handle portion comprises a holding mechanism to retain the controller after the controller is disposed into the handle portion.

6. The controller attachment apparatus of claim 5, wherein the holding mechanism is of sufficient flexibility to enable the controller to be clipped into and removed from the handle portion.

7. The controller attachment apparatus of claim 5, wherein the holding mechanism is a tab.

8. The controller attachment apparatus of claim 1, wherein the handle portion comprises a cutaway portion that is configured to allow access to a controller input or port after the controller is placed into the handle portion.

9. The controller attachment apparatus of claim 8, wherein the controller input is a button, directional pad, joystick, switch, or trigger.

10. The controller attachment apparatus of claim 1, wherein the handle portion and the attachment portion are a unitary piece.

11. The apparatus of claim 1, wherein the first coupler is a twist mechanism, sliding mechanism or a snap-on mechanism.

12. The controller attachment apparatus of claim 1, wherein the second coupler comprises a sleeve disposed on the attachment portion configured to accept the first coupler, and the controller attachment apparatus further comprises:
   a protrusion disposed on the sleeve or the second coupler,
   a track configured to accept the protrusion when the first coupler is inserted into the sleeve, and
   a locking mechanism positioned at the end of the track configured to engage the protrusion once the attachment mechanism is inserted into the sleeve and the protrusion reaches the locking mechanism.

13. The controller attachment apparatus of claim 12, wherein the flexible covering comprises an elastic material and the length of the track and the position of the locking mechanism are such that the elastic covering assists the locking mechanism in engaging the protrusion.

14. A controller attachment apparatus, comprising:
   a handle comprising a recess configured to releasably retain a controller and further comprising a first coupler;
   an attachment comprising a second coupler configured to mate with the first coupler, wherein the attachment is configured to be removably attached to the handle by engagement of the first and second couplers, wherein the second coupler comprises a sleeve portion configured to detachably couple with the first coupler;
   wherein the first coupler is further configured to allow a flexible covering to be removably disposed over the handle portion, wherein the flexible cover applies pressure to the first or second coupler to thereby facilitate locking the first and second couplers in a coupled configuration when the attachment and sleeve portion are coupled, and
   wherein the flexible covering comprises an opening to provide access to the controller.

15. The controller attachment apparatus of claim 14, wherein the coupling mechanism is further configured to allow the flexible covering to be removably disposed over the handle portion when the attachment is decoupled from the sleeve portion.

16. The controller attachment apparatus of claim 14, wherein the compressible portion of the flexible covering is near the coupling mechanism when the flexible covering is removably disposed over the handle portion.

* * * * *

UNITED STATES PATENT AND TRADEMARK OFFICE
CERTIFICATE OF CORRECTION

PATENT NO.        : 8,568,233 B2                            Page 1 of 1
APPLICATION NO.   : 12/766666
DATED             : October 29, 2013
INVENTOR(S)       : Gerard Lambert Block et al.

It is certified that error appears in the above-identified patent and that said Letters Patent is hereby corrected as shown below:

Title page, item (57) Abstract, line 5, the word "diposed" should read --disposed--

Signed and Sealed this
Twenty-eighth Day of January, 2014

Michelle K. Lee
*Deputy Director of the United States Patent and Trademark Office*